United States Patent
Puranam Hosudurg et al.

(10) Patent No.: US 11,106,689 B2
(45) Date of Patent: Aug. 31, 2021

(54) SYSTEM AND METHOD FOR SELF-SERVICE DATA ANALYTICS

(71) Applicant: Tata Consultancy Services Limited, Mumbai (IN)

(72) Inventors: Anantha Desik Puranam Hosudurg, Hyderabad (IN); Hiro Gangwani, Mumbai (IN)

(73) Assignee: Tate Consultancy Services Limited, Mumbai (IN)

( * ) Notice: Subject to any disclaimer, the term of this patent is extended or adjusted under 35 U.S.C. 154(b) by 0 days.

(21) Appl. No.: 16/817,986

(22) Filed: Mar. 13, 2020

(65) Prior Publication Data

US 2020/0349154 A1 Nov. 5, 2020

(30) Foreign Application Priority Data

May 2, 2019 (IN) .............................. 201921017608

(51) Int. Cl.
*G06F 16/00* (2019.01)
*G06F 16/2458* (2019.01)
(Continued)

(52) U.S. Cl.
CPC ...... *G06F 16/2465* (2019.01); *G06F 16/2282* (2019.01); *G06F 16/24534* (2019.01); *G06F 16/907* (2019.01); *G06F 2216/03* (2013.01)

(58) Field of Classification Search
CPC .......... G06F 16/2282; G06F 16/24534; G06F 16/2465; G06F 16/907; G06F 2216/03
See application file for complete search history.

(56) References Cited

U.S. PATENT DOCUMENTS 10,133,791 B1 * 11/2018 Chan .................. G06F 16/2465
2014/0156568 A1    6/2014 Ganguly et al.
(Continued)

FOREIGN PATENT DOCUMENTS

WO    WO-2016004075 A1 *  1/2016 ........... G06F 9/5066
WO    WO-2016049437 A1 *  3/2016 ......... G06F 16/9024

OTHER PUBLICATIONS

Khalifa, Shady. Achieving Consumable Big Data Analytics by Distributing Data Mining Algorithms. Diss. 2017. (Year: 2017).*

*Primary Examiner* — Diedra McQuitery
(74) *Attorney, Agent, or Firm* — Finnegan, Henderson, Farabow, Garrett & Dunner LLP (57) ABSTRACT

This disclosure relates generally to data analytics, and more particularly to a system and method for data analytics. The method includes accessing and processing sample data associated with a task to obtain a processed sample data set comprising additional columns than columns in the source data. During processing, metadata corresponding to the additional columns of the processed sample data set is dynamically captured. A plurality of data mining models are iteratively executed using the processed sample data set and the metadata. Said data mining models are obtained by varying variables and versions of a set of data mining models stored in a model repository to obtain a metrics corresponding to the plurality of data mining models. The metrics are indicative of performance of the data mining models. A data mining model is selected from amongst the plurality of data mining models based on the metrics to perform data analytics.

19 Claims, 3 Drawing Sheets

(51) Int. Cl.
*G06F 16/2453* (2019.01)
*G06F 16/907* (2019.01)
*G06F 16/22* (2019.01)

(56) References Cited

U.S. PATENT DOCUMENTS

| | | |
|---|---|---|
| 2014/0214897 A1* | 7/2014 | Zhu .................... G06F 16/2455 707/771 |
| 2016/0071017 A1* | 3/2016 | Adjaoute ............... G06N 20/00 706/52 |
| 2016/0132787 A1 | 5/2016 | Drevo et al. |
| 2017/0178020 A1 | 6/2017 | Duggan et al. |
| 2018/0046926 A1* | 2/2018 | Achin .................... G06Q 10/04 |
| 2018/0373781 A1* | 12/2018 | Palrecha .............. G06N 3/0427 |
| 2019/0258632 A1* | 8/2019 | Pal ...................... G06F 16/2465 |

* cited by examiner

SYSTEM AND METHOD FOR SELF-SERVICE DATA ANALYTICS

PRIORITY CLAIM

This U.S. patent application claims priority under 35 U.S.C. § 119 to: India Application No. 201921017608, filed on May 2, 2019. The entire contents of the aforementioned application are incorporated herein by reference.

TECHNICAL FIELD

The disclosure herein generally relates to advanced data analytics and, more particularly, to self-service data analytics system and method therefor.

BACKGROUND

Data analysis refers to use of technologies, infrastructure and tools, for inspection, cleansing, transformation, modeling, analysis and presentation of business information and/or data so as to improve and optimize business decisions and performance. Said business information is generally in form of patterns and/or rules. Key components of data analysis may include data mining, data modeling and data analytics.

Data mining process is leveraged for creation of data models which involves multiple steps and operations composed together and executed with iterative and repeatable approach. Data model creation is a key step in performing analytics operations for knowing data insights. Data models may be created by using a variety of machine learning algorithms. Data models describe patterns within an input data set. Additionally, once a data model is created, it is used to compare and classify new data against the observed patterns of the input data set. Said process of observing patterns and deriving meaningful insights using data models is known as Data analytics

SUMMARY

Embodiments of the present disclosure present technological improvements as solutions to one or more of the above-mentioned technical problems recognized by the inventors in conventional systems. For example, in one embodiment, a processor-implemented method for data analytics is provided. The method includes accessing sample data associated with a task, via one or more hardware processors. Further, the method includes processing sample data associated with the task to obtain a processed sample data set comprising at least one or more additional columns than columns in the source data, via the one or more hardware processors. Furthermore, the method includes dynamically capturing, during processing, metadata corresponding to the one or more additional columns of the processed sample data set, via the one or more hardware processors. Moreover, the method includes iteratively executing, using the processed sample data set and the metadata, a plurality of data mining models obtained by varying variables and versions of a set of data mining models stored in a model repository to obtain a plurality of metrics corresponding to the plurality of data mining models, via the one or more hardware processors, the plurality of metrics indicative of performance of the data mining models. Also, the method includes selecting, for data analytics, a data mining model from amongst the plurality of data mining models based on the plurality of metrics associated with the data mining models, via the one or more hardware processors.

In another aspect, a system for data analytics is provided. The system includes one or more memories; and one or more hardware processors, the one or more memories coupled to the one or more hardware processors, wherein the one or more hardware processors are capable of executing programmed instructions stored in the one or more memories to access sample data associated with a task from one or more sources comprising source data. Further, the one or more hardware processors are configured by the instructions to process sample data associated with the task to obtain a processed sample data set comprising at least one or more additional columns than columns in the source data. Furthermore, the one or more hardware processors are configured by the instructions to dynamically capture, during processing, metadata corresponding to the one or more additional columns of the processed sample data set. Moreover, the one or more hardware processors are configured by the instructions to iteratively execute, using the processed sample data set and the metadata, a plurality of data mining models obtained by varying variables and versions of a set of data mining models stored in a model repository to obtain a plurality of metrics corresponding to the plurality of data mining models, the plurality of metrics indicative of performance of the data mining models. Also, the one or more hardware processors are configured by the instructions to select, for data analytics, a data mining model from amongst the plurality of data mining models based on the plurality of metrics associated with the data mining models.

In yet another aspect, a non-transitory computer readable medium for data analytics are provided. Said one or more non-transitory machine readable information storage mediums comprises one or more instructions which when executed by one or more hardware processors causes accessing sample data associated with a task from one or more sources comprising source data. Further, the one or more instructions which when executed by one or more hardware processors causes processing sample data associated with the task to obtain a processed sample data set comprising at least one or more additional columns than columns in the source data, via the one or more hardware processors. Also, the one or more instructions which when executed by one or more hardware processors causes dynamically capturing, during processing, metadata corresponding to the one or more additional columns of the processed sample data set. Moreover, the one or more instructions which when executed by one or more hardware processors causes iteratively executing, using the processed sample data set and the metadata, a plurality of data mining models obtained by varying variables and versions of a set of data mining models stored in a model repository to obtain a plurality of metrics corresponding to the plurality of data mining models, the plurality of metrics indicative of performance of the data mining models. Also, the one or more instructions which when executed by one or more hardware processors causes selecting, for data analytics, a data mining model from amongst the plurality of data mining models based on the plurality of metrics associated with the data mining models.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The data mining process is leveraged for creation of data models which involves multiple steps and operations composed together executed with iterative and repeatable approach. The operations include collection of sample data from transaction systems, data wrangling, dynamic visualization and exploratory data analysis.

In order to apply analytical model algorithm, the data has to undergo processes such cleaning, massaging and exploratory analysis to suit the model algorithm requirement. Aforementioned processes are accomplished by performing data preparation, treatment and transformation. Data preparation includes, but is not limited to, missing value treatment, categorization, binning, and bucketing to create a number of new variables with different names dynamically without changing the original data.

Transformation includes modelling algorithms such as linear and logistic modelling. The transformation features such as date, linear, log and dimensionality reduction are required when handling data of significant number of variables. Said transformation features form an important part in sample data creation for any data model. Herein it will be understood that data preparation, treatment and transformation collectively forms more than seventy percent of tasks in the development of any data model. Conventional techniques employed for the processes of data cleansing, treatment and transformation are cumbersome, as said conventional techniques involve manual intervention.

Various embodiments disclosed herein provide method and system for data analytics. Particularly, the disclosed system provides a self-service platform with integrated user interface that enables data preparation and data modelling in a convenient and computationally-efficient manner. For example, the disclosed system performs the process of data cleansing, treatment and transformation in a user friendly manner by providing dynamic data visualization and filtering. In an embodiment, the disclosed system is capable of composing set of functional building blocks to perform data sample, data wrangling, exploratory data analysis and execute machine learning. Said functional blocks have plug and play capabilities and may be integrated with well-defined input and output blocks to provide model data insights using advanced data analytics. In an embodiment, the disclosed system reads metadata corresponding to the data dynamically during aforementioned processes, thereby reducing substantial computational effort in model development. These aforementioned and other aspects of the disclosed embodiments will be explained further in detail with reference to FIGS. 1-4.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 4, where similar reference characters denote corresponding features consistently throughout the figures, there are shown preferred embodiments and these embodiments are described in the context of the following exemplary system and/or method.

Figure 1:
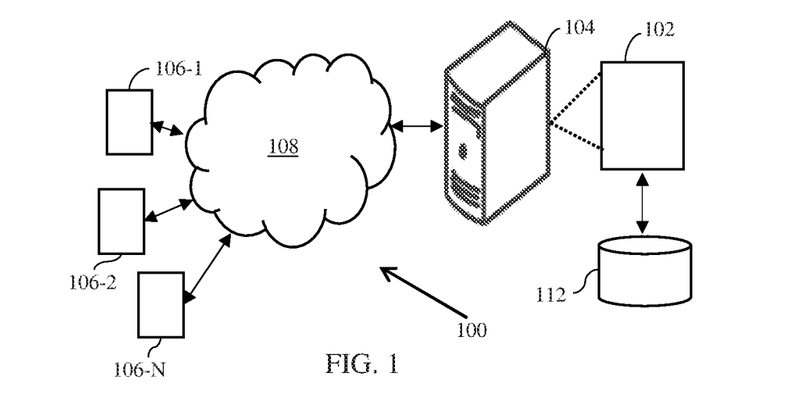
FIG. 1 illustrates an exemplary networking environment implementing a system for data analytics according to some embodiments of the present disclosure.

FIG. 1 illustrates a network environment 100 implementing a system 102 for data management, according to an embodiment of the present subject matter. In an embodiment, the system 102 is capable of performing data analytics by performing multiple steps, including, data sampling, data understanding, data preparation, Exploratory Data Analysis (EDA), modelling, evaluation and scoring. The data sampling step includes creating sample data out of large volume of historical data set. Data understanding provides data insights, statistics of current data set using dynamic visualization (Charts/Graphs). Data understanding is followed by data preparation where data anomalies are removed. In data transformation, new data is derived without impacting original data set. Exploratory Data Analysis provides information about advanced statistics and co-relation between data attributes. Data models, such as clustering, linear regression, logistics regression, Decision Tree, Market basket, are applied to the data obtained from EDA, and model outputs are evaluated to provide mechanism for measuring the accuracy of model created. Once the modeling is complete, the model may be deployed or executed in transaction data set.

In an embodiment, the system 102 provides for execution of machine learning algorithms for analytical model outcomes by composing set of functional building blocks. Said functional building blocks perform data sampling, data wrangling, exploratory data analysis and execute machine learning models. Moreover, said functional blocks have plug and play capabilities and can be integrated with well-defined input and output blocks of the disclosed system to provide model data insights using advanced data analytics, thereby automating the processes of data cleaning and data massaging by treatment and transformation. Additionally, the disclosed embodiments facilitate selection of sample data for training, selection of test data to run the data model, storing results of the data model, and scoring and/or productionizing the data. In an embodiment, the system may be embodied in a server in form of a computer system. An example computer system embodying the system 102 is described further with reference to FIG. 4.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. It will be understood that the system 102 may be accessed by multiple contributors through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108. Herein, the users of the user-devices 106 may include contributors, moderators, and so on.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

Further, as illustrated in FIG. 1, the network environment 100 supports various connectivity options such as BLU-ETOOTH®, USB, ZigBee and other cellular services. In an exemplary embodiment, the system 102 interfaces with sensors such as GPS, accelerometers, magnetic compass, audio sensors, camera sensors, and so on. Based on the data collected from various sensors, the system 102 with the help of various hardware and software platforms collectively performs the task of scalable data analytics on the captured sensor data in any smart computing environment. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to the smart computing environment. An example method for data analytics performed by the system 102 is described further in detail with reference to FIG. 2.

Figure 2:
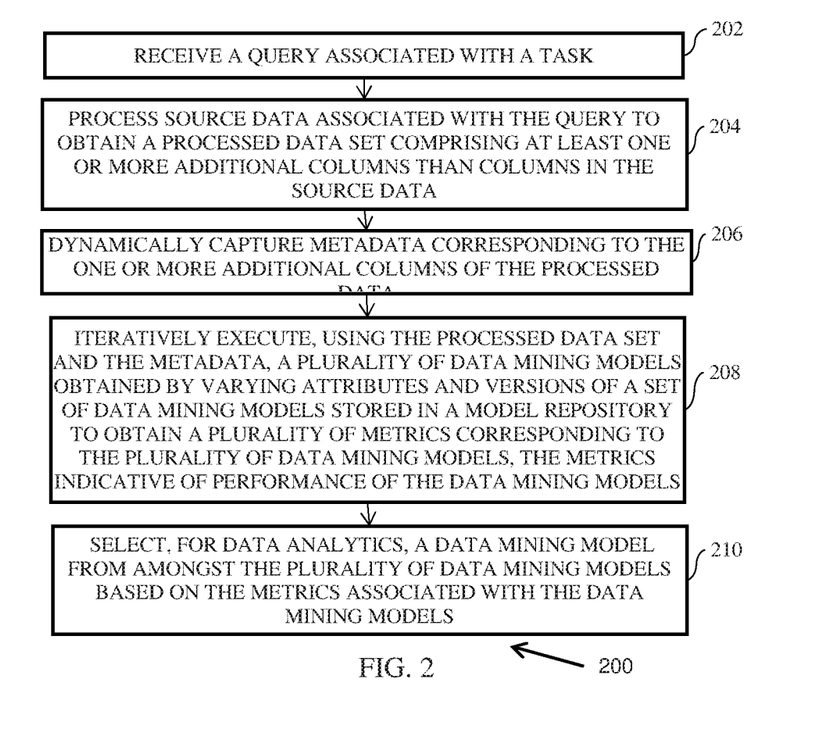
FIG. 2 is a flow diagram illustrating a method for data analytics in accordance with some embodiments of the present disclosure.

Referring now to FIG. 2, a flow diagram of a method 200 for a method for data analytics is described, in accordance with an example embodiment. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof. In an embodiment, the method 200 depicted in the flow chart may be executed by a system, for example, the system 102 of FIG. 1. In an example embodiment, the system 102 may be embodied in an exemplary computer system.

Referring to FIG. 2, in the illustrated embodiment, the method 200 is initiated when at 202, a sample data associated with a task is accessed from one or more sources comprising source data. Herein, the task may be pertaining to business requirement. For instance, the task may require forecasting decisions, making predictions, prescriptive tasks and recommendations. In an embodiment, the system 102 may access the sample data. The sample data may be accessed from one or more sources, such as flat files, CSV files, RDBMS, and so on stored in a central repository. Alternatively said sources may be remotely accessed by the system 102 (FIG. 1) to obtain source data therefrom. For example, in one scenario, the task may be associated with a decision to allow loan to a person, in such a scenario the source data may include details of credit, salary, assets etc. of the person, and the source may include banking records, asset records/documents, and so on of the person. In an embodiment, the sample data may be stored in form of one or more tables. The sample data may have metadata associated therewith. Examples of the metadata of the one or more tables includes, but are not limited to, a list of columns, and name and data type of the columns of the one or more tables.

At 204, the method 200 includes processing sample data to obtain a processed sample data set. In an embodiment, processing the sample data includes treating at least a portion of the sample data based on a plurality of data treatment rules to obtain a treated data set. Thereafter, transformation rules are applied on the treated data set to obtain transformed data set. The transformed data set so obtained contains one or more additional columns in the one or more tables. The transformed data set undergoes exploratory data analysis (EDA) to determine co-relation between attributes of the sample data. The obtained post processing includes one or more additional columns than columns in the sample data.

During processing of the sample data, metadata corresponding to the one or more additional columns of the processed sample data set is dynamically captured, at 206. In embodiment, the metadata corresponding to the one or more additional columns includes new variables corresponding to one or more attributes of the sample data set and a corresponding data type. An example flow-diagram describing dynamic capturing of the metadata is described in detail further with reference to FIG. 3.

Figure 3:
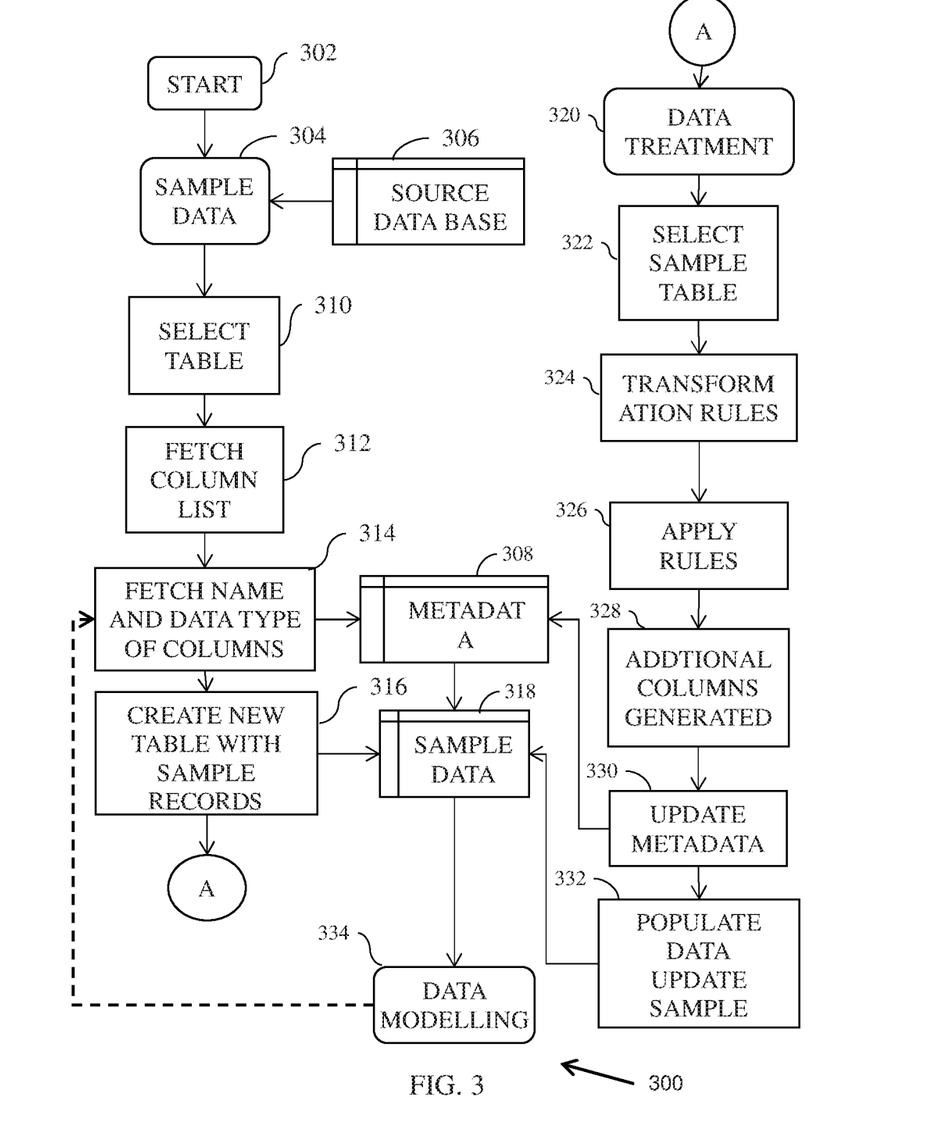
FIG. 3 is a flow diagram illustrating a method for data analytics in accordance with another embodiment of the present disclosure.

Referring to FIG. 3, an example flow diagram illustrating dynamic capturing of metadata is described in accordance with an example embodiment. It will be understood that for description of the method 300, references shall be made to FIGS. 1 and 2.

The method 300 initiates at 302. At 304, a sample data from a source data base 306 may be selected. Herein, the sample data may include data pertaining to a task that is to be executed by the system 102 (FIG. 1), as described in FIG. 2. The sample data may include multiple tables, each having multiple columns. The sample data may be exported from main transaction data associated with the task. Said sample data is used for creation of models.

In an embodiment, post sampling the sample data can be previewed in a table format for business understanding. For example, said data can be visualized using charts. In an embodiment, the sample data may be visualized using dynamic visualization through charts (for example, using d3js library).

At 310, one or more tables are selected from the sample data, and at 312 a column list is fetched from said table. The column list may include a list of columns of the said table. The metadata, for example, name and data type of the columns pertaining to the table of sample data may be stored in a metadata repository, for example a metadata repository 308, at 314.

At 316, a new table may be created with sample records. At 320, data treatment of the sample data is initiated. As previously described data treatment includes executing a set of data treatment rules to correct and/or refine the data set to remove anomalies. Examples of data treatment may include, but are not limited to rules for replacing missing values, merging categories in the data, date treatment, and so on. In an embodiment, the treated data obtained after the treatment may be visualized using dynamic visualization through charts. At 322, a sample table is selected, and transformation rules are accessed (at 324) and applied (at 326) on the selected sample table. On applying transformation rules, one or more additional columns are generated at 328. In an embodiment, an EDA is performed on the treated data to determine co-relation between attributes of the treated data. EDA may be performed by multi collinearity, dimensional reduction, and so on.

In an embodiment, the metadata corresponding to the one or more additional columns may be obtained, and new variables may be created and assigned to the metadata of the attributes of said additional columns. The metadata corresponding to the one or more additional columns and new variables assigned thereto may be updated in the metadata repository 308 at 330. Also, the transformed data is populated and the sample data is updated in the sample data repository 318 at 332. The updated sample data along with the updated metadata may be saved and utilized further for data modeling at 334.

In an embodiment, a job-flow associated with the model may be saved and further edited, for example, for obtaining versions of a model of the set of data mining models. For example, a user may fetch name and data type of columns at 314 follow the process flow from there onwards to edit a job-flow associated with the model. The method of dynamic capturing of metadata is described further in detail below with reference to Tables I-IV.

Referring collectively to tables I-IV, an example of dynamic capturing of the metadata is described. A sample data table I from a source data base is selected.

TABLE I

SALES

| ID | Firstname | Lastname | Gender | City | Issalary | Age | Customertype | Buy |
|---|---|---|---|---|---|---|---|---|
| 1 | Aaa | Bbb | Male | Mumbai | Y | 32 | New | 1 |
| 2 | Ccc | Ddd | Male | Delhi | Y | 45 | Old | 1 |
| 3 | Eee | Fff | Female | Pune | Y | 33 | New | 0 |
| 4 | Ggg | Hhh | Female | Delhi | N | 56 | New | 0 |

The sample data may include data pertaining to a task that is to be executed by the system 102 (FIG. 1), as described in FIG. 2. The sample data is shown to include a table having multiple columns. For example, the table I may have columns namely, first name, last name, gender, city, issalary (means whether salaried or not), age, customer type, whether product bought or not.

The metadata associated with the table I is stored in a metadata repository, for example metadata repository. The metadata may be stored in form of a table, for example table II. The metadata corresponding to the sample data presented in Table I is shown to include table name, column name, data type and length of the data.

TABLE II

METADATA

| Tablename | Columnname | Datatype | Length |
|---|---|---|---|
| Sales | Firstname | Varchar | 50 |
| Sales | Lastname | Varchar | 50 |

TABLE II-continued

METADATA

| Tablename | Columnname | Datatype | Length |
|---|---|---|---|
| Sales | Gender | Varchar | 10 |
| Sales | City | Varchar | 25 |
| Sales | Issalary | Char | 1 |
| Sales | Age | Int | |
| Sales | Customertype | Varchar | 10 |
| Sales | Buy | Int | |

Upon processing of the sample data, for example, by performing data treatment and data transformation, a new table may be created with sample records. For example, the new table corresponding to the table II may be table III, where the table III may have an additional column called gender_change.

TABLE III

Sales with updated column

| Id | Firstname | Lastname | Gender | Gender_chng | City | Issalary | Age | Customertype | Buy |
|---|---|---|---|---|---|---|---|---|---|
| 1 | Aaa | Bbb | Male | 0 | Mumbai | Y | 32 | New | 1 |
| 2 | Ccc | Ddd | Male | 0 | Delhi | Y | 45 | Old | 1 |

TABLE III-continued

| | | | | Sales with updated column | | | | | |
|---|---|---|---|---|---|---|---|---|---|
| Id | Firstname | Lastname | Gender | Gender_chng | City | Issalary | Age | Customertype | Buy |
| 3 | Eee | Fff | Female | 1 | Pune | Y | 33 | New | 0 |
| 4 | Ggg | Hhh | Female | 1 | Delhi | N | 56 | New | 0 |

The additional column (Gender_chng) in Table III is obtained by assigning integer values to the gender field of the table II. As is seen from the Table III, corresponding to the variables 'male' and 'female' of the attribute 'gender', a value '0' and '1' respectively are assigned in the additional column. Based on the new column generated during the processing of the sample data, the metadata is dynamically updated in the metadata repository, as represented in Table IV.

TABLE IV

| | Updated Metadata | | |
|---|---|---|---|
| tablename | columnname | datatype | length |
| Sales | firstname | varchar | 50 |
| Sales | lastname | varchar | 50 |
| Sales | gender | varchar | 10 |
| Sales | city | varchar | 25 |
| Sales | issalary | Char | 1 |
| Sales | age | Int | |
| Sales | customertype | Varchar | 10 |
| Sales | buy | Int | |
| Sales | gender_chng | int | |

For instance, corresponding to the column 'gender_change', the system 102 may update the metadata repository to include a row having table name as 'Sales', column name as gender_change, data type as 'int'. Herein, it will be understood that due to dynamic updating of the metadata (in the metadata repository) corresponding to the additional column in the sample data, the system 102 facilitates in computational savings (or performing the data analytics process in a computationally efficient manner) since the system reads the metadata at the time of creating additional or new columns during the processing of the sample data (unlike in conventional techniques where the meta data corresponding to the new columns is captured separately after creation of the new data leading to a computationally intensive process).

Referring back to FIG. 2, using the processed sample data set and the metadata, a plurality of data mining models may be obtained at 208. In an embodiment, a set of data mining models may be iteratively executed by varying attributes and versions thereof. In an embodiment, varying the versions of a model of the set of data mining models comprises editing a job-flow associated with the model (for example, as described previously with reference to FIG. 3). In an embodiment, the plurality of data mining models are executed using representational state transfer (REST) protocol.

The set of data mining models may be stored in a model repository. Examples of the set of data mining models includes, but are not limited to, Clustering, Logistic Regression with four different options (namely, Full model, Stepwise, Stepwise Backward and Stepwise Forward), Linear Regression, K-Nearest Neighborhood (KNN), Decision Tree Chi-square Automatic Interaction Detection (CHAID) and Market Basket (Apriori).

The Clustering (K-Means model) provides data patterns based on number of variables and used may be utilized for tasks associated with Marketing and behavior analysis. The linear regression model may facilitate prediction for continuous target variables. For instance, linear regression model may facilitate finding prediction of the age, salary, and the like used more in weather forecasting. The logistic regression model may provide prediction on binary target variable. For example, logistic regression model may be used in probability of bank loan leads, Fraud and others. The K-NN (Nearest Neighbored) model may classify the data in class in which the target belongs to. Said model is mostly used in Recommendation engine. The Decision Tree (CHAID) classifies the binary target data based on text, continuous and binary data. The CHAID model may be used for exploratory and prediction analysis used in different applications such as loan prediction and exploring the data analysis. The market basket (Apriori) analysis provides association between products and values. Said analysis is used mostly in marketing to determine which product is sold most frequently with other products.

In an embodiment, upon executing the set of data mining models a plurality of metrics corresponding to the plurality of data mining models are obtained. Herein, the plurality of metrics are indicative of performance of the data mining models. Examples of metrics may include but are not limited to confusion matrix, accuracy, ROC curve, and the like. In an embodiment, the plurality of data mining models along with corresponding metrics and attributes are stored in the model repository, for example the repository 112 (FIG. 1). At 210, a data mining model from amongst the plurality of data mining models may be selected based on the plurality of metrics associated with the data mining models.

Figure 4:
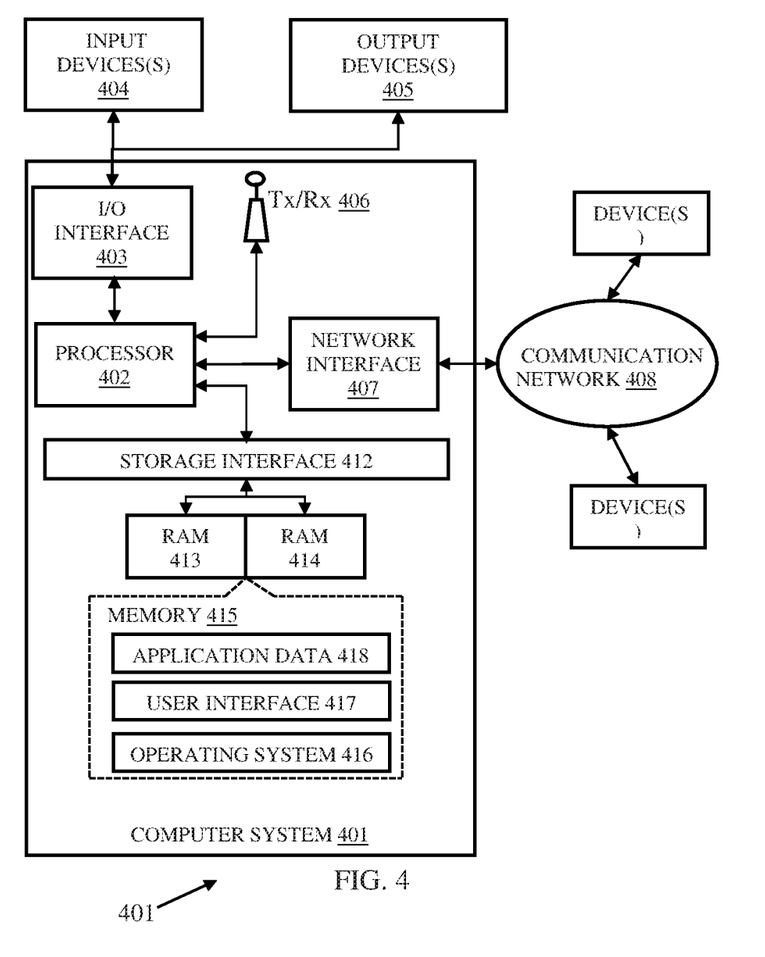
FIG. 4 is a block diagram of a self-service data analytics system according to some embodiments of the present disclosure.

FIG. 4 is a block diagram of an exemplary computer system 401 for implementing embodiments consistent with the present disclosure. The computer system 401 may be implemented in alone or in combination of components of the system 102 (FIG. 1). Variations of computer system 401 may be used for implementing the devices included in this disclosure. Computer system 401 may comprise a central processing unit ("CPU" or "hardware processor") 402. The hardware processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 402 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409 and 410. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 713, ROM 714, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 416, user interface application 417, user/application data 418 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 401 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario

An example of a query and the task disclosed in various embodiments herein is explained with reference to a banking scenario. In the example scenario, an XYZ bank may have multiple many underwriters working on loan underwriting for approval or rejection of loan. The XYZ bank may have provided a rulebook for the same, but some of the decisions may be user-based or manual decisions. The XYZ bank may however wish to automate decision process using data analytics (or analytical modelling) to bring homogeneity in the process and increase the productivity.

In an example scenario, the XYZ Bank may provide a transactional data thereof for a period of past one year. Said transactional data may include, for example, application form number, Business Rule output (Yes or No), New customer (Yes or No), Date of Birth, Female/Male, Married, Single/Divorce, Income, Loan value, residence (Permanent or Rented), Type of residence, Type of job, Education, Asset Value, and Credit score. For the data to be utilized by the data mining model for data analytics, it has to be loaded into the system, for instance the system 102 (FIG. 1), cleaned, prepared.

In data treatment, the system 102 checks missing values with the help of visualization. Data treatment involves all Yes or No to be converted to 1 and 0's. In the variable Single/Married/Divorce, if one of the categories for example, the 'divorce' category percentage is less, then the system may merge said category into other categories. Further, the system may convert all category variables into numbers. Similarly, variables such as house Type (rented/owned) fields may be converted into numbers. In data transformation, the system 102 calculates age based on date of birth and checks for any of the outliers where age greater than 60 and less than 10. The system 102 may normalize or bucket such categories to create new variables. The system 102 may further find the Log transformation to see the correlation of the variables.

Once all the data treatment/data transformation is complete, the system selects the data with variables and target percentage of data for the training and testing. The system 102 learns from training and applies the learning on testing. In system selects a model, for example, Logistic Regression with all the parameters, to generate an output and also test data metrics like Confusion Matrix to save the results and job. In case, the metrics are not correct the user can edit model job from the first step of sample data selection, select new variables to train and test, execute the model, and check if it provides satisfactory output and metrics. If the satisfactory output is received, then said output can be saved. For example, in a first model run and a second model run, which ever meets the business requirement can be consumed User can select the model job and run on the new data connecting to the Database or CSV to score new customer as approved or reject. As aforementioned process of selecting model job is automated, these processes in the system are automated. The system automates the process of cleaning, massaging by treatment and transformation. The user can select sample data with training and test data to run the model and store the model results and also scoring/productioning the data.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for data analytics. The embodiments of present disclosure herein addresses unresolved problem of computational intensive steps involved in data analytics. In an embodiment, the disclosed method includes dynamically capturing metadata corresponding to additional columns that are generated during data preparation. An advantage of dynamically capturing said metadata is that it precludes manual process involved in creating the metadata, thereby resulting in computationally efficient method for data analytics. In addition, the disclosed system facilitates in storing the data mining models (after being trained and tested), thereby facilitating in consuming output for making decisions.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for data analytics, the method comprising:

accessing sample data associated with a task from one or more sources comprising source data, via one or more hardware processors;

processing sample data associated with the task to obtain a processed sample data set comprising at least one or more additional columns than columns in the source data, via the one or more hardware processors;

dynamically capturing metadata corresponding to the one or more additional columns of the processed sample data set during the processing of the sample data, via the one or more hardware processors;

iteratively executing, using the processed sample data set and the metadata, a plurality of data mining models obtained by varying variables and versions of a set of data mining models stored in a model repository to obtain a plurality of metrics corresponding to the plurality of data mining models, via the one or more hardware processors, wherein the plurality of metrics indicative of performance of the data mining models; and selecting, for data analytics, a data mining model from amongst the plurality of data mining models based on the plurality of metrics, via the one or more hardware processors.

2. The method as claimed in claim 1, wherein processing the sample data comprises:

treating at least a portion of the sample data based on a plurality of data treatment rules to obtain a treated data set, wherein the source data associated with the task is stored in form of one or more tables; and applying transformation rules on the treated data set to obtain transformed data set, the transformed data set comprising the one or more additional columns in the one or more tables.

3. The method as claimed in claim 2, wherein processing the data further comprises performing exploratory data analysis on the treated data to determine co-relation between variables of the treated data.

4. The method as claimed in claim 1, wherein dynamically capturing the metadata corresponding to the one or more additional columns comprises:

updating metadata of one or more tables with the metadata corresponding to the one or more additional columns on generating the one or more additional columns, wherein the metadata of the one or more tables comprises at least a list of columns, and name and data type of the columns of the one or more tables, and wherein the metadata corresponding to the one or more additional columns comprises new variables corresponding to one or more variables of the sample data and a corresponding data type.

5. The method as claimed in claim 1, wherein the model repository further comprises variables and the plurality of metrics corresponding to the plurality of data mining models.

6. The method as claimed in claim 1, wherein varying the versions of a data mining model from amongst the set of data mining models comprises editing a job-flow associated with the data mining model.

7. The method as claimed in claim 1, wherein the set of data mining models comprises Clustering, Logistic Regression with four different options (namely, Full model, Stepwise, Stepwise Backward and Stepwise Forward), Linear Regression, K-Nearest Neighborhood (KNN), Decision Tree Chi-square Automatic Interaction Detection (CHAID) and Market Basket (Apriori).

8. The method as claimed in claim 1, wherein the plurality of data mining models are executed using representational state transfer (REST) protocol.

9. The method as claimed in claim 1, further comprising providing dynamic visualization of the processed sample data.

10. A system for data analytics, comprising:
one or more memories; and
one or more hardware processors, the one or more memories coupled to the one or more hardware processors, wherein the one or more hardware processors are capable of executing programmed instructions stored in the one or more memories to:
access sample data associated with a task from one or more sources comprising source data;
process sample data associated with the task to obtain a processed sample data set comprising at least one or more additional columns than columns in the source data;
dynamically capture metadata corresponding to the one or more additional columns of the processed sample data set during the processing of the sample data;
iteratively execute, using the processed sample data set and the metadata, a plurality of data mining models obtained by varying variables and versions of a set of data mining models stored in a model repository to obtain a plurality of metrics corresponding to the plurality of data mining models, the plurality of metrics indicative of performance of the data mining models; and
select, for data analytics, a data mining model from amongst the plurality of data mining models based on the plurality of metrics.

11. The system as claimed in claim 10, wherein to process the sample data, the one or more hardware processors are configured by the instructions to:

treat at least a portion of the sample data based on a plurality of data treatment rules to obtain a treated data set, the source data associated with the task is stored in form of one or more tables; and apply transformation rules on the treated data set to obtain transformed data set, the transformed data set comprising the one or more additional columns in the one or more tables.

12. The system as claimed in claim 11, wherein to process the data, the one or more hardware processors are configured by the instructions to perform exploratory data analysis on the treated data to determine co-relation between variables of the treated data.

13. The system as claimed in claim 10, wherein to dynamically capture the metadata corresponding to the one or more additional columns, the one or more hardware processors are configured by the instructions to:

update metadata of one or more tables with the metadata corresponding to the one or more additional columns on generating the one or more additional columns, wherein the metadata of the one or more tables comprises at least a list of columns, and name and data type of the columns of the one or more tables, and wherein the metadata corresponding to the one or more additional columns comprises new variables corresponding to one or more variables of the sample data and a corresponding data type.

14. The system as claimed in claim 10, wherein the model repository further comprises variables and the plurality of metrics corresponding to the plurality of data mining models.

15. The system as claimed in claim 10, wherein to vary the versions of a data mining model from amongst the set of data mining models, the one or more hardware processors are configured by the instructions to edit a job-flow associated with the data mining model.

16. The system as claimed in claim 10, wherein the set of data mining models comprises Clustering, Logistic Regression with four different options (namely, Full model, Stepwise, Stepwise Backward and Stepwise Forward), Linear Regression, K-Nearest Neighborhood (KNN), Decision Tree Chi-square Automatic Interaction Detection (CHAID) and Market Basket (Apriori).

17. The system as claimed in claim 10, wherein the plurality of data mining models are executed using representational state transfer (REST) protocol.

18. The system as claimed in claim 10, wherein the one or more hardware processors are configured by the instructions to provide dynamic visualization of the processed sample data.

19. One or more non-transitory machine readable information storage mediums comprising one or more instructions which when executed by one or more hardware processors cause:

accessing sample data associated with a task from one or more sources comprising source data, via one or more hardware processors;

processing sample data associated with the task to obtain a processed sample data set comprising at least one or more additional columns than columns in the source data, via the one or more hardware processors;

dynamically capturing metadata corresponding to the one or more additional columns of the processed sample data set during the processing of the sample data, via the one or more hardware processors;

iteratively executing, using the processed sample data set and the metadata, a plurality of data mining models obtained by varying variables and versions of a set of data mining models stored in a model repository to obtain a plurality of metrics corresponding to the plurality of data mining models, via the one or more hardware processors, wherein the plurality of metrics indicative of performance of the data mining models; and selecting, for data analytics, a data mining model from amongst the plurality of data mining models based on the plurality of metrics, via the one or more hardware processors.

\* \* \* \* \*